(12) United States Patent
Wandres

(10) Patent No.: US 11,721,970 B2
(45) Date of Patent: Aug. 8, 2023

(54) ON-BOARD ELECTRICAL SYSTEM FOR A VEHICLE AND PROCESS FOR OPERATING AN ON-BOARD ELECTRICAL SYSTEM

(71) Applicant: Eberspächer Controls Landau GmbH & Co. KG, Landau (DE)

(72) Inventor: Steffen Wandres, Kandel (DE)

(73) Assignee: Eberspächer Controls Landau GmbH & Co. KG, Landau (DE)

(*) Notice: Subject to any disclaimer, the term of this patent is extended or adjusted under 35 U.S.C. 154(b) by 163 days.

(21) Appl. No.: 17/307,338

(22) Filed: May 4, 2021

(65) Prior Publication Data
US 2021/0351584 A1 Nov. 11, 2021

(30) Foreign Application Priority Data
May 5, 2020 (DE) ................... 10 2020 112 074.5

(51) Int. Cl.
*H02H 7/22* (2006.01)
*H02J 7/00* (2006.01)
*B60R 16/033* (2006.01)

(52) U.S. Cl.
CPC ............ *H02H 7/22* (2013.01); *B60R 16/033* (2013.01); *H02J 7/00714* (2020.01)

(58) Field of Classification Search
CPC ...... H02H 7/22; B60R 16/033; H02J 7/00714
See application file for complete search history.

(56) References Cited

U.S. PATENT DOCUMENTS

| 5,977,652 A | * | 11/1999 | Frey | ............ H02J 7/1423 307/64 |
| 2019/0366958 A1 | * | 12/2019 | Kreth | ............ B60R 16/033 |
| 2021/0391708 A1 | * | 12/2021 | Wandres | ............ H02H 7/12 |

FOREIGN PATENT DOCUMENTS

| DE | 102013003586 A1 | 9/2013 |
| DE | 102015108372 A1 | 12/2016 |
| DE | 102018216491 B3 | 12/2019 |
| DE | 102019205801 A1 | 10/2020 |
| EP | 0 800 254 A2 | 10/1997 |
| WO | 2008/014944 A1 | 2/2008 |
| WO | 2012/156028 A1 | 11/2012 |

* cited by examiner

*Primary Examiner* — Adolf D Berhane
*Assistant Examiner* — Afework S Demisse
(74) *Attorney, Agent, or Firm* — McGlew and Tuttle, P.C.

(57) ABSTRACT

An on-board electrical system for a vehicle includes an on-board power supply system (12) with a plurality of electrical energy consumers, and at least one on-board power supply system battery (14). At least one short circuit breaking device (28) disconnects a short circuit-relevant system area (22) from the on-board power supply system (12) when a short circuit occurs in the area of the short circuit-relevant system area (22).

9 Claims, 1 Drawing Sheet

ON-BOARD ELECTRICAL SYSTEM FOR A VEHICLE AND PROCESS FOR OPERATING AN ON-BOARD ELECTRICAL SYSTEM

CROSS REFERENCE TO RELATED APPLICATIONS

This application claims the benefit of priority under 35 U.S.C. § 119 of German Application 10 2020 112 074.5, filed May 5, 2020, the entire contents of which are incorporated herein by reference.

TECHNICAL FIELD

The present invention pertains to an on-board electrical system for a vehicle and to a process for operating such an on-board electrical system.

TECHNICAL BACKGROUND

On-board electrical systems of vehicles have areas of the main paths of current that are critical or susceptible concerning the occurrence of short circuits. If a short circuit occurs in such a system area, which is relevant for short circuit, for example, in case of an accident, this may cause the supply voltage to drop below a critical value in the entire on-board power supply system and components or system areas, which are also to be operated in this state, e.g., an antilock braking system, a transmission control or an electrical steering, not to be able to be operated any longer.

SUMMARY

An object of the present invention is to provide an on-board electrical system for a vehicle and a process for operating such an on-board electrical system, which guarantee the ability, especially of safety-relevant system areas of a vehicle, to operate even when a short circuit occurs.

According to a first aspect of the present invention, this object is accomplished by an on-board electrical system for a vehicle, comprising:
- an on-board power supply system with a plurality of electrical energy consumers,
- at least one on-board power supply system battery, and
- at least one short circuit breaking device for disconnecting a system area that is relevant for short circuit from the on-board power supply system when a short circuit occurs in the area of the short circuit-relevant system area.

The short circuit breaking device to be provided according to the present invention makes it possible to disconnect a short circuit-relevant system area protected by the short circuit breaking device, i.e., a system area that is subject to the potential risk of occurrence of a short circuit, for example, in case of an accident, from the on-board power supply system such that a voltage drop in the on-board power supply system, which does not allow the at least partially continued operation of, for example, safety-relevant system areas of a vehicle any longer, is avoided.

Provisions may be made in case of a configuration that is advantageous especially also concerning the comparatively high currents occurring during a normal operation for the at least one short circuit breaking device to comprise at least one MOSFET circuit component, wherein the at least one MOSFET circuit component has an input terminal and an output terminal and has a line connection between the input terminal and the output terminal in a closed state and has a blocking effect as a diode in an open state in the direction from the output terminal to the input terminal.

In order to make it possible to utilize the blocking effect of such a MOSFET circuit component for the case of the occurrence of a short circuit in a short circuit-relevant system area, the at least one short circuit-relevant system area may have a system area output terminal, and the system area output terminal may be connected to the input terminal of the at least one MOSFET circuit component of a short circuit breaking device.

If the on-board power supply system is connected to the output terminal of the at least one MOSFET circuit component, a voltage drop is reliably avoided on the side of the on-board power supply system by utilizing the blocking effect of the at least one MOSFET circuit component when a short circuit occurs on the side of the input terminal of the at least one MOSFET circuit component.

In order to make it possible to supply the on-board power supply system with electrical energy even when the at least one MOSFET circuit component becomes active in the case of a short circuit, it is proposed that the on-board power supply system be connected to an on-board power supply system battery output terminal of the at least one on-board power supply system battery, and that the on-board power supply system battery output terminal be connected to the output terminal of the at least one MOSFET circuit component. The short circuit breaking device thus also ensures a decoupling between the short circuit-relevant system area and the at least one on-board power supply system battery when a short circuit occurs in the area of this short circuit-relevant system area.

The at least one short circuit-relevant system area may comprise, for example, a d.c. voltage source, preferably a DC/DC converter or generator, by which the on-board power supply system can be supplied with electrical energy in the presence of functionality or an on-board power supply system battery can also be charged.

Since a short circuit may also occur in the area of an on-board power supply system battery, it is proposed according to another aspect of the present invention that the at least one short circuit-relevant system area comprise the at least one on-board power supply system battery, and that an on-board power supply system battery output terminal be connected to the input terminal of the at least one MOSFET circuit component of a short circuit breaking device and that the on-board power supply system be connected to the output terminal of the at least of MOSFET circuit component. It is thus guaranteed by the at least one MOSFET circuit component of the short circuit breaking device associated with such an on-board power supply system battery that a short circuit occurring in the area of such an on-board power supply system battery cannot lead to a voltage drop in the entire on-board power supply system.

In order for at least a part of the system areas to be supplied with electrical energy in the on-board power supply system to be able to continue to operate in this case, i.e., when a short circuit occurs in an on-board power supply system battery protected in this respect by a short circuit breaking device, it is proposed that the on-board power supply system be connected to an output terminal of a d.c. voltage source, preferably a DC/DC converter or generator.

Since it must be guaranteed in case of correct functionality that the at least one on-board power supply system battery protected by such a short circuit breaking device can be charged, it is further proposed that the at least one MOSFET circuit component is in its closed state when the charging current to the on-board power supply system battery output terminal is below a current threshold and it switches over into its open state in case of a charging current exceeding the current threshold.

According to another aspect, the present invention pertains to a process for operating an on-board electrical system configured according to the present invention. When a short circuit occurs in the area of the at least one short circuit-relevant system area, the at least one short circuit breaking device is switched in this process into a disconnected state causing the short circuit-relevant system area to be disconnected from the on-board power supply system or is in the disconnected state.

Especially when a short circuit-relevant system area protected by such a short circuit breaking device is provided by at least one on-board power supply system battery, the charging of the on-board power supply system battery can be guaranteed according to an advantageous aspect of the present invention by the fact that when a charging current to the at least one on-board power supply system battery is below the current threshold representing a maximum allowable current especially in the charged state, the at least one MOSFET circuit component is switched into its closed state or is maintained in its closed state, and it is switched into its open state when the charging current exceeds the current threshold.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
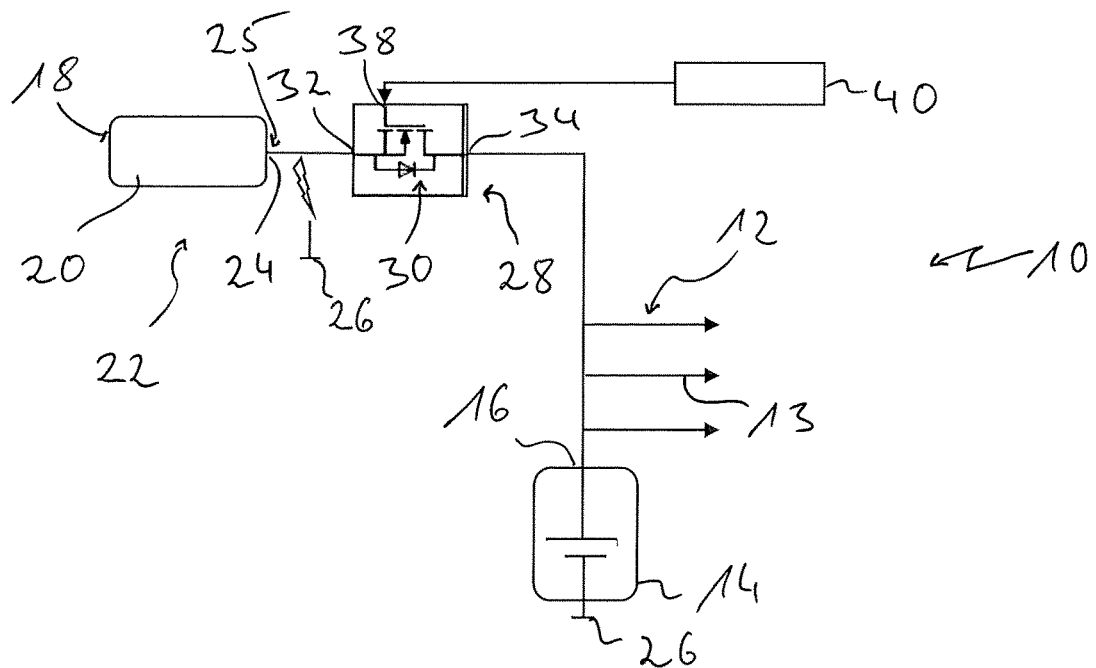
FIG. 1 is a schematic view of an on-board electrical system according to a first embodiment.

Referring to the drawings, an on-board electrical system for a vehicle is generally designated by 10 in FIG. 1. The on-board electrical system 10 comprises an on-board power supply system 12, which comprises a plurality of electrical consumers 12, indicated by arrows, in a vehicle. The on-board electrical system 10 further comprises an on-board power supply system battery 14, whose positive pole, which is to be considered to be the on-board power supply system battery output terminal 16 in the sense of the present invention, is connected to the on-board power supply system 12 in order to supply the consumers present in the on-board power supply system 12 with electrical energy from the on-board power supply system battery 14. The negative pole of the on-board power supply system battery 14 may be connected to or define the ground potential 26 of the vehicle.

The on-board electrical system 10 further comprises a DC/DC converter (direct current/direct current converter) 20 as an example of a d.c. voltage source 18 provided in a vehicle.

In the exemplary embodiment of an on-board electrical system 10 shown in FIG. 1, the DC/DC converter 20 represents a short circuit-relevant system area 22 or is arranged in such a short circuit-relevant system area of the vehicle. When an internal error occurs in the DC/DC converter 20 or in the case of an accident, there is a possibility that a short circuit to the ground potential is established via an output terminal 24 of the DC/DC converter 20 representing a short circuit-relevant system area 22. If the output terminal 24 of the DC/DC converter 20, which forms in this embodiment of the on-board electrical system 10 a system area output terminal 25 of the short circuit-relevant system area 22, were connected to the on-board power supply system 12 and also to the on-board power supply system battery output terminal 16, the occurrence of such a short circuit in the area of the DC/DC converter 20 would lead to a voltage drop, because the on-board power supply system battery output terminal 16 would also be connected to the ground potential 26.

In order to counteract this problem, a short circuit breaking device generally designated by 28 is provided in the on-board electrical system 10. This short circuit breaking device 28 may be configured, for example, as a circuit breaker known or commercially available, e.g., under the trade name Q diode (quasi diode), and comprise one MOSFET circuit component 30, and preferably a plurality of MOSFET circuit components 30 connected in parallel to one another. The source terminal of such a MOSFET circuit component 30 or of each such MOSFET circuit component 30 is connected to an input terminal 32 of this short circuit breaking device 28 or it provides same. The drain terminal of the MOSFET circuit component 30 or of each such MOSFET circuit component 30 is connected to the output terminal 34 of this short circuit breaking device 28 or it provides same. The MOSFET circuit component 30 or each MOSFET circuit component 30 of the short circuit breaking device 28 can be switched via a gate terminal 38 or via a voltage applied to this gate terminal by a driving device 40 between a closed state and an open state. For example, when a gate voltage is present, the MOSFET circuit component 30 or each MOSFET circuit component 30 or the short circuit breaking device 28 may be in its closed state, in which there is a conductive connection between the input terminal 32 and the output terminal 34 in each of the two possible current flow directions. When no gate voltage is present, the MOSFET circuit component 30 or each MOSFET circuit component 30 and hence the short circuit breaking device 28 are in their open state, in which this short circuit breaking device 28 has the functionality of a diode, which has a blocking effect in the direction from the output terminal 34 to the input terminal 32, but it allows a current flow from the input terminal 32 to the output terminal 34.

In case of correct functionality of the on-board electrical system 10 and if no short circuit is present in the short circuit-relevant system area 22 protected by the short circuit breaking device 28, i.e., in the area of the DC/DC converter 20, the latter can supply the on-board power supply system 12 with electrical energy or also supply a charging current for the on-board power supply system battery 14 regardless of whether a gate voltage is present or not. The short circuit breaking device 28 or its MOSFET circuit component 30 could, in principle, be switched in such a normal operating state into the closed state. If a discharge of the on-board power supply system battery 14 in the direction of the DC/DC converter 20 shall be avoided, the short circuit breaking device 28 can be maintained in its open state.

If a short circuit to the ground potential occurs in the area of the DC/DC converter 20, i.e., on the side of the input terminal 32 of the short circuit breaking device 28 or of the MOSFET circuit components 30 thereof, the short circuit breaking device 28 blocks a current flow in the direction of the DC/DC converter based on the diode functionality of the MOSFET circuit component 30 or MOSFET circuit components 30, so that this DC/DC converter is decoupled from the on-board power supply system 12 or from the on-board power supply system battery 14 and the on-board power supply system 12 continues to be able to be supplied reliably from the on-board power supply system battery. At least an emergency operation can then be maintained in this state for safety-relevant system areas of a vehicle, e.g., the antilock braking system, the transmission control or an electrical steering. If the short circuit breaking device 28 was in the closed state before, the short circuit breaking device 28 can be switched into its open state when an excessively high current flow is detected in the area of the DC/DC converter, which is indicative of the occurrence of a short circuit, so that the decoupling of the on-board power supply system 12 and of the on-board power supply system battery 14 from the area in which a short circuit has occurred is guaranteed.

Especially such circuit breakers known as Q diodes respond extraordinarily rapidly to the occurrence of such a current flow and block the current flow from the on-board power supply system 12 or from the on-board power supply system battery 14 in the direction of the short circuit-relevant system area 22 in less than 100 μsec.

Figure 2:
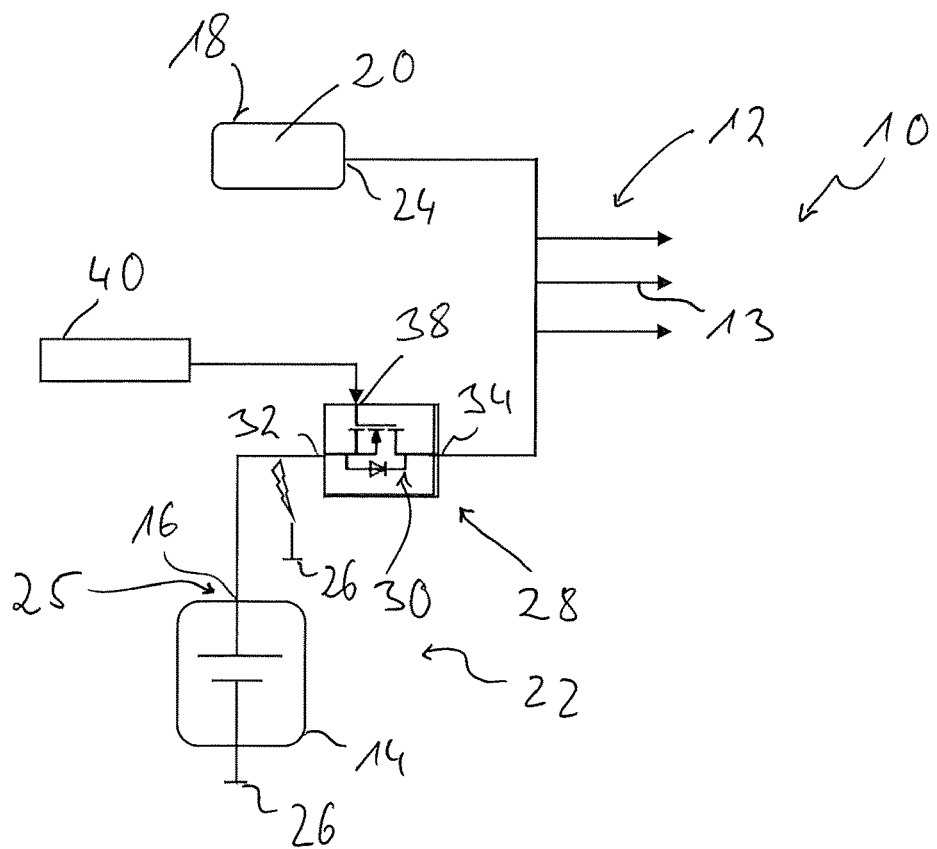
FIG. 2 is a schematic view of an on-board electrical system according to a second embodiment.

In the embodiment shown in FIG. 2, the on-board power supply system battery 14 represents the short circuit-relevant system area 22 of a vehicle. The on-board power supply system battery output terminal 16, i.e., the positive pole of the on-board power supply system battery 14, is therefore connected in this embodiment to the input terminal 32 of the short circuit breaking device 28 or of the MOSFET circuit component 30 or MOSFET circuit components 30 thereof, while the on-board power supply system 12 is connected to the output terminal 34 of the short circuit breaking device 28. Further, the output terminal 24 of the DC/DC converter 20 operating as a d.c. voltage source 28 may be connected in this embodiment to the on-board power supply system 12, so that the on-board power supply system 12 can be supplied from both the on-board power supply system battery 14 and the DC/DC converter 20 in this embodiment of an on-board electrical system 10 as well.

If a short circuit to the ground potential occurs in the area of the on-board power supply system battery 14, the short circuit breaking device 28 blocks immediately and prevents a current flow from the DC/DC converter 20 to the on-board power supply system battery 14, so that this DC/DC converter 20 continues to be able to supply the on-board power supply system 12 with electrical energy and a voltage drop in the area of the on-board power supply system 12 is prevented.

Since the battery 14 is to be charged via the DC/DC converter 20 or another generator, which may be connected to the on-board power supply system 12, in the embodiment shown in FIG. 2 as well, it must be ensured that the short circuit breaking device 28 allows a current flow to the output terminal 16, i.e., to the positive pole, of the on-board power supply system battery 14, in case of correct functionality, so that the on-board power supply system battery 14 can be charged by such a charging current. A corresponding gate voltage is applied for this purpose by means of the driving device 40 to the gate terminal 38 or to the gate terminals 38 or of the MOSFET circuit component 30 or of the MOSFET circuit components 30 of this short circuit breaking device 28 in order to switch this into the closed state. If a short circuit occurs, which would lead to an immediate increase of the charging current, the charging current exceeds a current threshold in the range of, for example, 50 A, which is assigned to this. The short circuit current may equal several 100 A in case of such a short circuit. This is detected by the monitoring of the charging current to the on-board power supply system battery 14 and the short circuit breaking device 28 is switched into its open state when the current threshold is exceeded, so that a continued current flow in the direction of the on-board power supply system battery 14 or in the direction of the area in which a short circuit has occurred is prevented and the on-board power supply system 12 continues to be able to be supplied from the d.c. voltage source 18 or from the DC/DC converter 20.

In a structurally simple manner, the present invention creates the possibility of reliably decoupling a system area that is potentially subject to the risk of occurrence of a short circuit when such a short circuit occurs. The system areas to be supplied with electrical energy in an on-board power supply system can continue to be able to be supplied as before, without there being a risk for a voltage drop.

It should be noted that a plurality of system areas that are potentially high-risk areas concerning the occurrence of a short circuit can be protected by such a short circuit breaking device in a vehicle or in an on-board power supply system. Such a short circuit breaking device could be provided, for example, both in association with the on-board power supply system battery and in association with a d.c. voltage source comprising, for example, a DC/DC converter. It would also be possible to provide a plurality of on-board power supply system batteries, in which case such a short circuit breaking device with the above-described functionality can be provided in association with all such on-board power supply system batteries together or with every individual on-board power supply system battery or with some of such on-board power supply system batteries.

While specific embodiments of the invention have been shown and described in detail to illustrate the application of the principles of the invention, it will be understood that the invention may be embodied otherwise without departing from such principles.

What is claimed is:

1. An on-board electrical system for a vehicle, the on-board electrical system comprising:
   an on-board power supply system with a plurality of electrical energy consumers;
   at least one on-board power supply system battery;
   a d.c. voltage source; and
   at least one short circuit breaking device for disconnecting a short circuit-relevant system area from the on-board power supply system when a short circuit occurs in the area of the short circuit-relevant system area, wherein:
   the at least one short circuit breaking device comprises at least one MOSFET circuit component;
   the at least one MOSFET circuit component has an input terminal and an output terminal and has a line connection between the input terminal and the output terminal in a closed state and has a diode blocking effect in a direction from the output terminal to the input terminal in an open state;
   the at least one short circuit-relevant system area comprises the at least one on-board power supply system battery or the d.c. voltage source;
   the at least one short circuit-relevant system area has a system area output terminal connected to the input terminal of the at least one MOSFET circuit component of the short circuit breaking device; and the on-board power supply system is connected to the output terminal of the at least one MOSFET circuit component.

2. The on-board electrical system in accordance with claim 1, wherein, when the at least one short circuit-relevant system area comprises the d.c. voltage source, the on-board power supply system is connected to an on-board power supply system battery output terminal of the at least one on-board power supply system battery and the on-board power supply system battery output terminal is connected to the output terminal of the at least one MOSFET circuit component.

3. The on-board electrical system in accordance with claim 1, wherein the d.c. voltage source comprises a DC/DC converter or a generator.

4. The on-board electrical system in accordance with claim 1, wherein, when the at least one short circuit-relevant system area comprises the at least one on-board power supply system battery, and an on-board power supply system battery output terminal is connected to the input terminal of the at least one MOSFET circuit component of the short circuit breaking device and the on-board power supply system is connected to the output terminal of the at least one MOSFET circuit component.

5. The on-board electrical system in accordance with claim 4, wherein the on-board power supply system is connected to an output terminal of a d.c. voltage source.

6. The on-board electrical system in accordance with claim 1, wherein the at least one MOSFET circuit component is in the closed state in case of a charging current to the on-board power supply system battery output terminal below a current threshold and the at least one MOSFET circuit component switches over into the open state in case of a charging current exceeding the current threshold.

7. A vehicle on-board electrical system operation process comprising:
provseding an on-board electrical system comprising: an on-board power supply system with a plurality of electrical energy consumers; at least one on-board power supply system battery; and at least one short circuit breaking device for disconnecting a short circuit-relevant system area from the on-board power supply system when a short circuit occurs in the area of the short circuit-relevant system area; and
switching the at least one short circuit breaking device into a disconnected state causing the short circuit-relevant system area to be disconnected from the on-board power supply system or is in the disconnected state when a short circuit occurs in the area of the at least one short circuit-relevant system area, wherein:
the at least one short circuit breaking device comprises at least one MOSFET circuit component;
the at least one MOSFET circuit component has an input terminal and an output terminal and has a line connection between the input terminal and the output terminal in a closed state and has a diode blocking effect in a direction from the output terminal to the input terminal in an open state;

the at least one short circuit-relevant system area has a system area output terminal connected to the input terminal of the at least one MOSFET circuit component of the short circuit breaking device;
the at least one short circuit-relevant system area comprises the at least one on-board power supply system battery;
an on-board power supply system battery output terminal is connected to the input terminal of the at least one MOSFET circuit component of the short circuit breaking device and the on-board power supply system is connected to the output terminal of the at least one MOSFET circuit component; and
the at least one MOSFET circuit component is in the closed state in case of a charging current to the on-board power supply system battery output terminal below a current threshold and the at least one MOSFET circuit component switches over into the open state in case of a charging current exceeding the current threshold.

8. The vehicle on-board electrical system operation process in accordance with claim 7, wherein the at least one MOSFET circuit component is switched into the closed state or is maintained in the closed state when a charging current to the at least one on-board power supply system battery is below the current threshold, and the at least one MOSFET circuit component is switched into the open state when the charging current exceeds the current threshold.

9. An on-board electrical system for a vehicle, the on-board electrical system comprising:
an on-board power supply system comprising a plurality of electrical energy consumers;
an on-board power supply system battery;
a d.c. voltage source; and
a short circuit breaking device configured to disconnect a short circuit-relevant system area from the on-board power supply system when a short circuit occurs in an area of at least one short circuit-relevant system area, the at least one short circuit-relevant system area comprising one of the at least one on-board power supply system battery and the d.c. voltage source, the short circuit breaking device comprising at least one MOSFET circuit component having an open state, a closed state, an input terminal and an output terminal, the at least one MOSFET circuit component having a line connection between the input terminal and the output terminal in the closed state, the at least one MOSFET circuit component having a diode blocking effect in a direction from the output terminal to the input terminal in the open state, the at least one short circuit-relevant system area having a system area output terminal connected to the input terminal of the at least one MOSFET circuit component, the on-board power supply system being connected to the output terminal of the at least one MOSFET circuit component.

* * * * *